Patented Aug. 25, 1936

UNITED STATES PATENT OFFICE 2,051,807

PRODUCTION OF THIOETHERS AND SATURATED HYDROCARBONS FROM MERCAPTANS

Clyve Charles Allen, Berkeley, Calif., assignor to Shell Development Company, San Francisco, Calif., a corporation of Delaware No Drawing. Application March 18, 1935, Serial No. 11,680

22 Claims. (Cl. 260—151)

This invention relates to a process for reacting an unsaturated organic compound with a mercaptan at an elevated temperature and a superatmospheric pressure to obtain a valuable addition product of the class consisting of thioethers and saturated hydrocarbons.

This invention provides a practical and economical method for the utilization of mercaptans to effect the conversion of olefinic compounds, particularly those contained in or derived from petroleum and/or petroleum products, such as the olefines, polyolefines and the olefine polymers, to valuable addition products thereof. I may react a suitable unsaturated compound with a mercaptan under such conditions that addition of the mercaptan to the olefinic bond occurs resulting in a product materially predominating in the corresponding thioether, or I may react an unsaturated compound with a mercaptan in such amount and under such conditions that hydrogen from the reacted mercaptan is added to the olefinic bond or bonds of the unsaturated compound to produce a product materially predominating in the corresponding saturated hydrocarbon.

The nature of the addition product predominantly obtained is dependent upon the constitution of the olefine, the temperature at which reaction is effected, the phase in which reaction occurs, the contact time of the reactants and upon the molal ratio of the reactants present in the system. By a suitable control of these reaction factors, my invention may be executed to obtain the desired addition product, readily and economically, in excellent yields.

The execution of my invention to obtain substantially only a thioether is advantageously effected with the reactants in the gaseous phase at a superatmospheric pressure at temperatures in the range of from about 35° C. to about 200° C. If the corresponding saturated hydrocarbon is desired as the main reaction product, the best results are obtained when the reaction is effected with the reactants in the liquid phase under a superatmospheric pressure and a temperature materially above about 200° C. Under about the same conditions of temperature and pressure, the execution of the invention to obtain a substantial yield of the corresponding saturated hydrocarbon usually requires a longer time of contact of the reactants.

The reaction of a mono-olefine with a mercaptan, in accordance with my invention, may be considered as a simple addition as represented by the equation:

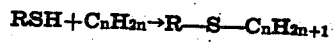

Under conditions favorable to the occurrence of this reaction, the best results may be obtained by contacting the reactants in the ratio of at least one mol of the olefine to each mol of mercaptan. In the case that a poly-olefine is treated, said poly-olefine is contacted with not more than an equivalent quantity of mercaptan and the main reaction product is a polythioether.

The reaction of a mono-olefinic compound with a mercaptan under conditions favoring the formation of the corresponding saturated hydrocarbon, may occur to a certain extent via the mechanism represented by the equation:

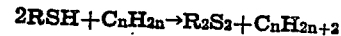

This reaction may be favored by maintaining the mercaptan in the reaction system in an amount equivalent to or in excess of the olefinic compound. The above reaction appears to be most advantageously executed in the liquid phase. With the lower boiling olefinic compounds and mercaptans, it may be difficult to effect reaction in the liquid phase since the critical temperature of the reaction mixture may be below the temperature necessary to effect the desired reaction at a practical rate. Accordingly, the reaction to form a saturated hydrocarbon is preferably executed with the higher boiling unsaturated compounds and/or mercaptans selected with respect to their combined vapor pressures so that the reaction occurs in the liquid phase at the desired operating temperature. For example, olefines containing at least six carbon atoms to the molecule and especially those possessing a tertiary carbon atom are preferably reacted with aliphatic mercaptans containing at least four carbon atoms.

The unsaturated compounds to which my invention is particularly applicable possess at least one olefinic linkage between two aliphatic carbon atoms regardless of the character of the compound embracing such a linkage. The unsaturated hydrocarbons such as the olefines, which term is intended to also include the olefine polymers and polyolefines, are particularly contemplated; however, it is to be understood that such compound wherein one or more hydrogen atoms have been substituted by suitable organic and/or inorganic substituents may be advantageously employed.

My invention is generally executed with compounds such as ethylene, propylene, the butylenes, the amylenes, the hexylenes, the heptylenes, the octylenes, etc. and their higher homologues as well as their analogues such as the phenyl and naphthyl ethylenes, propylenes, butylenes, etc. and the polyolefines such as divinyl, diallyl, isoprene, diisopropenyl, diisobutenyl and the like. A particularly suitable group of olefinic hydrocarbons which may be converted to the corresponding valuable saturated hydrocarbons are the olefine polymers, particularly those containing at least six carbon atoms and a branched chain such as diisobutylene, tributylene, tetraisobutylene, the polyisoamylenes, the polyisohexylenes, the polyisoheptylenes, etc. Such olefine polymers may be converted to the corresponding thioethers or the corresponding saturated branched chain hydrocarbons which are particularly useful as fuels and components of fuel mixtures.

I may employ the unsaturated compounds severally or treat mixtures comprising more than one species in which case mixed products may be obtained. In some cases, reaction may be advantageously effected in the presence of relatively unreactive substances such as paraffins, halogenated hydrocarbons, oils, inert gases and the like, which substances may act as diluents and/or as solvents or they may by virtue of their vapor pressure enable me to employ greater operating pressures when desired. I may treat technical olefine-containing mixtures without separating the olefine or olefines therefrom. Such mixtures may be obtained by the pyrogenesis of petroleum, petroleum products, shale oil, etc. and by the destructive distillation of coal, peat, pitches, tars, asphalts and the like carbonaceous materials. If desired, such an olefine-containing mixture may be fractionated into cuts containing, for the most part, compounds possessing the same number of carbon atoms. A typical fraction of this sort is the butane-butene cut which usually contains normal and iso- butanes and butylenes and sometimes small amounts of diisobutylene. If desired, the olefines or a particular olefine may be separated from such a cut or the original mixture by fractionation, extraction, condensation or the like means. The use of a pure or substantially pure olefinic material may facilitate reaction control and recovery of pure products.

Any sufficiently stable mercaptan is suitable as a reactant in accordance with my invention. A suitable mercaptan may contain one or more —SH groups and be of alkyl, aralkyl, alkenyl, aralkenyl or aryl character and comprise the mercapto radical linked to an aliphatic or aromatic carbon atom. I prefer, in the majority of cases, to employ the normal or iso alkyl chain mercaptans of primary, secondary and tertiary character, particularly those contained in or derived from petroleum and petroleum products. The methyl, ethyl, butyl, amyl, hexyl, heptyl, octyl and the like mercaptans, as well as their homologues, analogues and substitution products, may be employed with excellent results.

The invention is preferably executed under substantially anhydrous conditions. Prior to effecting reaction, the reagents or mixtures containing them may be rendered substantially anhydrous by a suitable drying operation. To insure anhydrous conditions, I preferably effect reaction in the presence of a sufficient quantity of a suitable water-binding agent to combine with and remove from the sphere of reaction free water initially present or formed in the course of the reaction. A suitable water-binding agent will be capable of existing as a fluid or dissolved in the reaction mixture under operating conditions and be capable of combining with and retaining water without detrimentally affecting the reaction. A group of preferably employed water-binding agents includes the anhydrides of carboxylic acids, such as the anhydrides of the acids as acetic, propionic, butyric, isobutyric, valeric, isovaleric, caproic, crotonic, malonic, maleic, succinic, benzoic, cinnamic and the like as well as their homologues, analogues and suitable substitution products.

My invention may be executed in the presence or absence of materials capable of catalyzing the reaction. In the majority of cases when the object is to produce primarily mercaptans and/or thioethers, the reaction is accelerated by the presence of metals and metal compounds, particularly the metal sulphides, which act as catalysts. A group of suitable catalysts which may be employed severally or in combination includes the sulphides of calcium, beryllium, zinc, magnesium, strontium, barium, aluminum, chromium, zirconium, tin, copper, thallium, vanadium, molybdenum, tungsten, arsenic, antimony, platinum, nickel, iron and cobalt. The sulphides of nickel, iron and cobalt are particularly active and preferably employed catalysts which may be conveniently and economically prepared from readily available and inexpensive materials.

The particular catalyst or catalyst composition to be employed may be prepared in an active state in a variety of manners. The metals and/or their compounds such as the oxides, hydroxides, etc. may be treated with hydrogen sulphide and converted to the sulphides before or during the course of the reaction, or other sulphidizing agents may be reacted with metals or metal compounds under conditions favorable to metal sulphide formation. Active metal sulphides may also be prepared by the thermal decomposition of the corresponding thio-salts.

The catalytic material may be applied as a finely divided powder, as granules, as pellets or in any other convenient form. If desired, the catalytic material may be precipitated upon an inert carrier such as pumice, silica gel, kieselguhr, charcoal, etc.

When metal reaction vessels are used, the catalytic metal sulphide may be deposited in the form of a film on the interior surface thereof. Such a catalyst coating may be conveniently formed by contacting the clean metal surface with hydrogen sulphide or a solution of a soluble hydrosulphide or sulphide under conditions at which the desired metal sulphide is formed.

The invention is in general executed in closed reaction vessels with the reaction mixture under the total vapor pressure of its constituents at the reaction temperature. The pressure employed is greater than atmospheric and dependent upon the temperature and whether a gas or liquid phase reaction is desired. If desired, the pressure on the reaction mixture may be increased by the introduction of an inert volatile liquid or gas. The addition reactions which occur in accordance with my invention are favored by the higher pressures, however, excessively high pressures, for example those greater than about 3500 lbs./sq. in., may favor undesirable side reactions and render the process less economical in that costly high pressure equipment would be necessitated.

I preferably execute my invention at temperatures sufficiently elevated to permit reaction at a practical rate but sufficiently low to substantially avoid the occurrence of undesirable side reactions such as polymerization and pyrolysis. The temperature that may be advantageously employed is dependent upon the type of product desired, the reaction time, the thermal stability of the reactants and upon whether gas or liquid phase reaction is desired. In general, temperatures in the range of from about 35° C. to about 500° C. are suitable. The thioethers are preferably prepared at temperatures of from 35° C. to 200° C., and more particularly in the range of from about 100° C. to about 200° C., while temperatures of from about 200° C. to about 500° C. are generally the most suitable for saturated hydrocarbon production.

When a metal sulphide catalyst is employed, the stability of said catalyst or catalyst mixture also determines, to a certain extent, the optimum reaction temperature. For example, ferric sulphide suffers partial decomposition and loss of catalytic activity at temperatures of about 190° C., while nickel sulphide is substantially stable and active at temperatures of 300° C. and higher.

My invention may be executed in a batch, intermittent or continuous manner. The reactants and/or a third agent may be charged, severally or in admixture, to a suitable reaction vessel such as an autoclave or tubular reactor equipped with heating and cooling means. A suitable water-binding agent and/or catalyst may be added before, during or after introduction of the reactants to the reactor. The reaction mixture is heated to the desired temperature and under the desired elevated pressure for a time sufficient to effect the desired degree of reaction. Agitation as by mechanical stirring may be advantageous, especially when reaction is effected in the liquid phase in the presence of a solid catalyst. The reaction product or products may be recovered from the reaction mixture by any suitable means such as fractionation, condensation, stratification, extraction and the like. The unreacted reagents may be recovered and reutilized in the same or another reaction unit.

Another mode of executing my invention, which is particularly suitable for intermittent and continuous modes of operation, comprises passing the gaseous and/or liquid reactants, at the desired rate, severally or in combination, continuously or intermittently, into a reaction chamber maintained at a suitable temperature and which may or may not contain catalytic material. The reaction occurs therein at the desired rate under a superatmospheric pressure. The reacted mixture may be continuously or intermittently withdrawn from the reaction vessel and, if desired, conducted to a separation and/or purification stage wherein the product or products is or are separated from each other and the unreacted reagents and the latter, if present, conducted to the same or another reactor for reutilization therein.

Other suitable modes of operation and modifications of those described will be apparent to those skilled in the art to which my invention appertains.

Reference will be had to the following specific examples which typify preferred modes of executing my invention. It is to be understood that these examples are for illustrative purposes and that the invention is not to be limited thereby.

Example I

The interior surface of a steel autoclave was coated with a film of active iron sulphide and charged with a mixture containing about 45 gm. (0.5 mol) of tertiary butyl mercaptan, 28 gm. (0.5 mols) of isobutene and about 2 gm. of acetic anhydride. The autoclave was closed and its contents heated at a temperature of from 140° C. to 150° C. for about 5 hours. At the end of this time, the cooled contents of the autoclave were discharged therefrom, cooled, neutralized and analyzed. The analysis showed that 72.5 gm. (0.495 mols) of di-tertiary butyl sulphide, representing a yield of 99%, were obtained. The reaction occurred in the gas phase.

Example II

The interior surface of an autoclave was coated with a thin film of active nickel sulphide. A mixture containing about 50 gm. (0.89 mols) of β-butylene, about 40 gm. (0.645 mols) of ethyl mercaptan and about 2 gm. of acetic anhydride was charged to the autoclave and heated to a temperature of about 200° C. for about 15 hours. At the end of this time the reaction mixture was cooled, discharged from the reaction vessel and fractionated. The product obtained boiled in the range of from 130.0° C. to 131.5° C. at atmospheric pressure. It appears that the reaction occurred in the gas phase to form 37.6 gm. of ethyl secondary butyl sulphide. This represents a yield of 97.2% calculated on the ethyl mercaptan consumed.

Example III

An autoclave possessing an active nickel sulphide film on its interior surface was charged with a mixture containing about 49 gm. (0.645 mols) of normal propyl mercaptan, 2 gm. of acetic anhydride and about 54 gm. (0.77 mols) of tertiary amylene obtained by dehydrating tertiary amyl alcohol. This mixture was treated in the gas phase under the combined vapor pressure of its constituents at a temperature of from about 200° C. to 210° C. for about 15 hours. The cooled reaction mixture was neutralized and fractionated. 19.1 grams of propyl mercaptan and 52.5 gm. (0.393 mols) of propyl tertiary amyl sulphide boiling in the range of from about 170° C. to 175° C. were obtained. These results indicate that 51% of the tertiary amylene reacted to form the thioether. The thioether was obtained in a yield of 95% calculated on the tertiary amylene reacted.

Example IV

The interior surface of a nickel autoclave was coated with a film of active nickel sulphide. The autoclave was charged with about 40 gm. (0.645 mols) of ethyl mercaptan, 50 gm. (0.89 mols) of isobutene and about 3 gm. of butyric anhydride. The autoclave was closed and its contents heated at about 200° C. for about 15 hours. The reaction occurred in the gas phase under a superatmospheric pressure equal to the combined vapor pressures of the constituents of the reaction mixture at 200° C. The cooled reaction mixture was discharged from the autoclave, neutralized and fractionated. It was found that 26.4 gm. or 47.8% of the applied isobutene reacted to form ethyl tertiary butyl sulphide. About 50 gm. (0.427 mols) of ethyl tertiary butyl sulphide, boiling in the range of from 116.5° C. to 118.5° C., were obtained. The thioether was obtained in a yield of about 100% calculated on the consumed isobutene.

Example V

About 224.3 gm. (2.0 mols) of diisobutylene were charged to an autoclave and about 614.0 gm. (4.2 mols) of octyl mercaptan were added thereto. The mixture was heated for about three hours at a temperature of 290° C. with the reaction mixture under the combined vapor pressure of its constituents. The cooled reaction mixture was discharged from the reaction vessel and fractionated.

The main reaction products were iso-octane and octenyl disulphide. About 201.4 gm. (1.77 mols) of iso-octane were obtained. This represents a yield of about 88.6% calculated on the diisobutylene applied.

In addition to providing a practical and economical process for the production of useful thioethers and saturated hydrocarbons, the principles of my invention may be applied with excellent results to the purification of fluid mixtures containing mercaptans and/or unsaturated hydrocarbons. For example, gaseous or liquid mixtures of hydrocarbons containing mercaptans may be admixed with the required amount of an olefine and the mixture treated in accordance with my invention whereby substantially all of the mercaptan content is converted to thioethers which may be readily removed therefrom. My process may be used as a means of sweetening mineral oils, pressure distillates, gasoline, kerosene, etc., by converting the mercaptans contained therein into readily removable thioethers. Such petroleum distillates may be treated in accordance with my invention in either the liquid or the vapor phase and the thioethers removed from the treated mixture by treating with sulphuric acid, liquid ammonia or other suitable reagents.

My invention provides a novel and economical process for the production of symmetrical and mixed thioethers, many of which cannot be practically prepared in accordance with the known methods of thioether synthesis. The thioethers may be represented by the formula R—S—R' wherein R and R' may be the same or different and represent alkyl, aryl, aralkyl, alkenyl, aralkenyl, alicyclic or heterocyclic radicals which may be further substituted. A particularly suitable group of thioethers are those wherein R and R' are different and represent aliphatic radicals.

The thioethers prepared in accordance with my invention are useful as solvents for various organic materials. The thioethers, as well as mixtures containing them in relatively high concentration, are solvents for rubber, resins such as abietic acid, paracumaron, meta- and para-cresol-sulphur chloride resins and petroleum resins. Mixtures of the thioethers with aliphatic alcohols are useful as solvents for cellulose esters. The thioethers, in addition, are useful as constituents of fly-repellents and insecticides and, in addition, they are valuable as intermediates in the production of pyroxylin and pharmaceutical chemicals such as the soporific sulphones.

The higher saturated hydrocarbons which I obtain in the execution of my invention, particularly those of branched chain structure, are useful as fuels, as components of fuel mixtures, as lubricants and components of lubricating oils, as solvents, as raw material for resin production, etc.

While I have described my invention in a detailed manner and provided specific examples of suitable modes of executing the same, it is to be understood that modifications may be made and that no limitations, other than those imposed by the scope of the appended claims, are intended.

I claim as my invention:

1. A process for the production of an addition product of the class consisting of thioethers and saturated hydrocarbons which comprises reacting a hydrocarbon containing an olefinic linkage between two aliphatic carbon atoms with a mercaptan at a superatmospheric pressure and a temperature greater than about 35° C. but below the temperature at which substantial pyrolysis occurs.

2. A process for the production of an addition compound of the class consisting of thioethers and saturated hydrocarbons which comprises reacting a hydrocarbon containing an olefinic linkage between two aliphatic carbon atoms with a mercaptan at a superatmospheric pressure and a temperature of from about 35° C. to about 500° C.

3. A process for the production of an addition compound of the class consisting of thioethers and saturated hydrocarbons which comprises reacting a hydrocarbon containing an olefinic linkage between two aliphatic carbon atoms with a mercaptan in the presence of a metal sulphide catalyst at a superatmospheric pressure and a temperature of from about 35° C. to about 500° C.

4. A process for the production of an addition product of the class consisting of thioethers and saturated hydrocarbons which comprises reacting an olefine with a mercaptan at a superatmospheric pressure and a temperature of from about 35° C. to about 500° C.

5. A process for the production of an addition product of the class consisting of thioethers and saturated hydrocarbons which comprises reacting an olefine with a mercaptan under substantially anhydrous conditions and in the presence of a metal sulphide catalyst at a superatmospheric pressure and a temperature of from about 35° C. to about 500° C.

6. A process for the production of a thioether which comprises reacting an olefine with a mercaptan at a superatmospheric pressure and a temperature of from about 35° C. to about 500° C.

7. A process for the production of a thioether which comprises reacting an olefine with a mercaptan at a superatmospheric pressure and a temperature of from 35° C. to about 200° C.

8. A process for the production of a thioether which comprises reacting an olefine with a mercaptan in the presence of a metal sulphide catalyst at a superatmospheric pressure and a temperature of from 35° C. to about 200° C.

9. A process for the production of a thioether which comprises reacting an olefine with a mercaptan under substantially anhydrous conditions in the presence of a carboxylic acid anhydride and a metal sulphide catalyst under a superatmospheric pressure and a temperature of from about 100° C. to about 200° C.

10. A process for the production of a thioether which comprises reacting an olefine with a mercaptan in the presence of a carboxylic acid anhydride at a superatmospheric pressure and a temperature of from about 35° C. to about 200° C.

11. A process for the production of a thioether which comprises reacting an olefine with a mercaptan in the presence of a sulphide of a metal selected from the group consisting of nickel, iron and cobalt at a superatmospheric pressure and a temperature of from about 35° C. to about 200° C.

12. A process for the production of an aliphatic thioether which comprises reacting an open-chain olefine with an aliphatic mercaptan in the presence of a carboxylic acid anhydride at a superatmospheric pressure and a temperature of from about 35° C. to about 200° C.

13. A process for the production of a mixed aliphatic thioether which comprises reacting an open-chain olefine with an aliphatic mercaptan containing a dissimilar number of carbon atoms at a superatmospheric pressure and a temperature of from 35° C. to 200° C.

14. A process for the production of a saturated hydrocarbon which comprises reacting an olefine with a mercaptan at a superatmospheric pressure and a temperature of from about 200° C. to about 500° C.

15. A process for the production of a saturated hydrocarbon which comprises reacting an olefine containing at least six carbon atoms to the molecule with a mercaptan at a superatmospheric pressure and a temperature of from 200° C. to 500° C.

16. A process for the production of a saturated hydrocarbon which comprises reacting an olefine containing at least six carbon atoms with an aliphatic mercaptan containing at least four carbon atoms at a superatmospheric pressure and a temperature of from 200° C. to 500° C.

17. A process for the production of a saturated hydrocarbon which comprises reacting an olefine containing at least six carbon atoms with an aliphatic mercaptan containing at least four carbon atoms in the presence of a carboxylic acid anhydride at a superatmospheric pressure and a temperature of from 200° C. to 500° C.

18. A process for the production of a valuable branched chain saturated hydrocarbon which comprises reacting an olefine containing at least six carbon atoms at least one of which is tertiary with an aliphatic mercaptan containing at least four carbon atoms at a superatmospheric pressure and a temperature of from 200° C. to 500° C.

19. A process for the production of iso-octane which comprises reacting diisobutylene with an aliphatic mercaptan containing at least four carbon atoms at a superatmospheric pressure and a temperature of from 200° C. to 500° C.

20. A process for the production of a tertiary butyl sulphide which comprises reacting isobutylene with an aliphatic mercaptan in the presence of a carboxylic acid anhydride and a metal sulphide catalyst selected from the class consisting of nickel, iron and cobalt sulphides at a superatmospheric pressure and a temperature of from about 35° C. to about 200° C.

21. A process for the production of di-tertiary butyl sulphide which comprises reacting isobutylene with tertiary butyl mercaptan in the presence of a carboxylic acid anhydride and a metal sulphide catalyst selected from the class consisting of nickel, iron and cobalt sulphides at a superatmospheric pressure and a temperature of from about 35° C. to about 200° C.

22. A process for the production of a propyl tertiary amyl sulphide which comprises reacting a tertiary amylene with a propyl mercaptan in the presence of a carboxylic acid anhydride and a metal-sulphide catalyst selected from the class consisting of nickel, iron and cobalt sulphides at a superatmospheric pressure and a temperature of from about 35° C. to about 200° C.

CLYVE CHARLES ALLEN.